April 30, 1968     R. C. BOWERS ET AL     3,380,563
TWO-WAY OVERRUNNING CLUTCH MECHANISM
Filed March 14, 1966     2 Sheets-Sheet 1
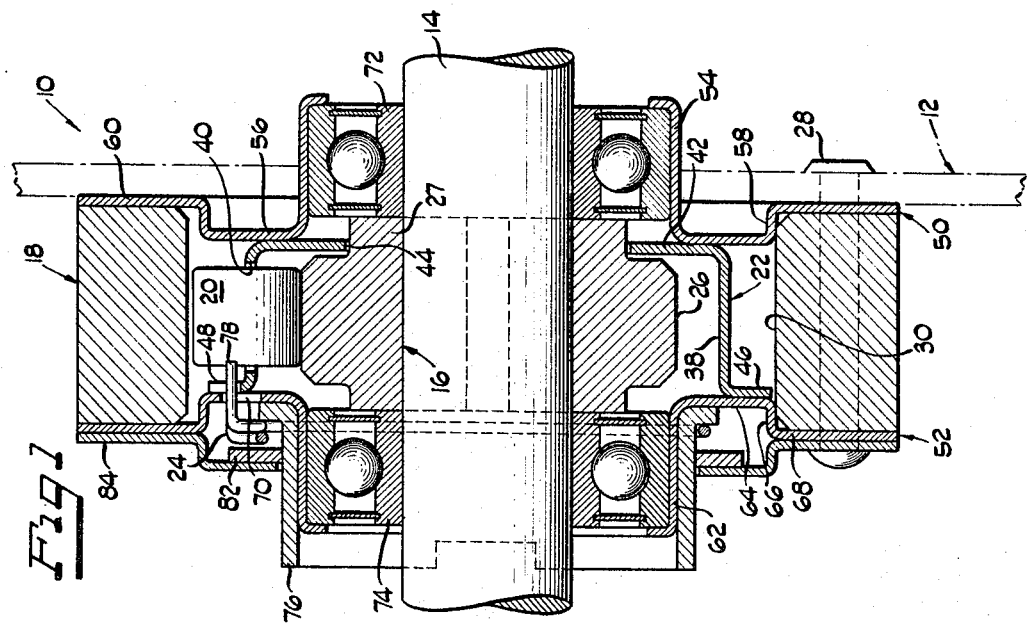
INVENTORS
ROY C. BOWERS
RUSSELL E. SILBERSCHLAG
BY Herman E. Smith
ATTORNEY

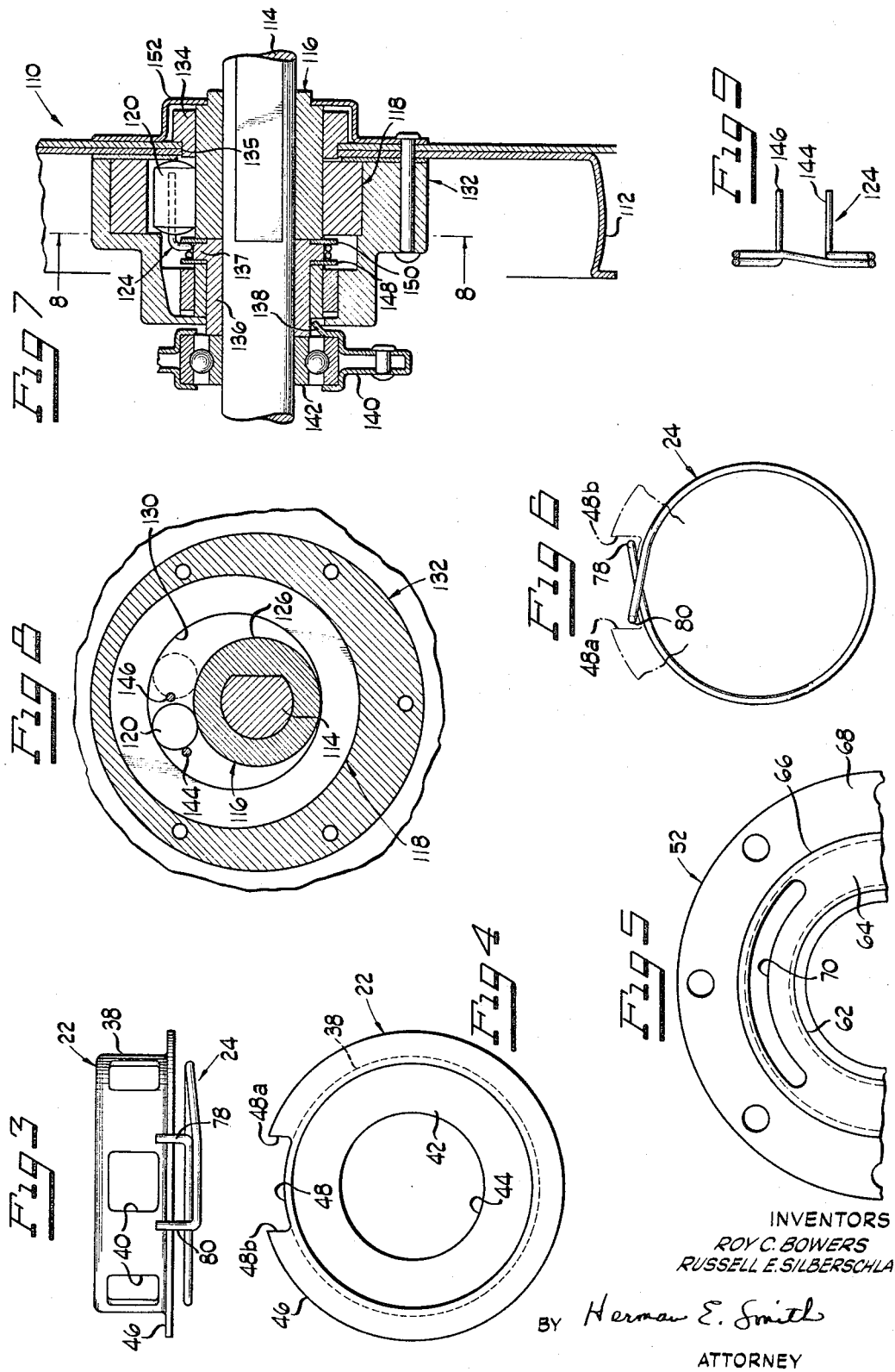

United States Patent Office 3,380,563
Patented Apr. 30, 1968

3,380,563
TWO-WAY OVERRUNNING CLUTCH MECHANISM
Roy C. Bowers, Northbrook, and Russell E. Silberschlag, Glen Ellyn, Ill., assignors to Borg-Warner Corporation, Chicago, Ill., a corporation of Illinois
Filed Mar. 14, 1966, Ser. No. 534,057
7 Claims. (Cl. 192—44)

ABSTRACT OF THE DISCLOSURE

A two-way overrunning clutch is automatically conditioned for operation in either direction according to the direction of rotation of the input shaft. A drag spring engaged with the grippers has a portion wrapped about a nonrotatable member which serves to ground the gripper when the clutch is not rotating. Rotation of the clutch unwraps the drag spring from the nonrotatable member releasing the grippers for rotation with the clutch assembly.

---

This invention relates to clutch mechanisms, and particularly to clutches of the two-way overrunning type.

A principal object of this invention is to provide a clutch unit which will transmit rotation in either direction in response to changes in direction of rotation of a driving member, and which will allow the driven member to overrun the driving member in the direction of rotation.

Another object of this invention is to provide a novel means for holding the clutching unit in a disengaged position while the direction of rotation of the driving and driven members is being reversed.

A still further object of this invention is to provide in the above clutch unit a drag spring for holding the gripping elements out of clutching engagement with the associated race means while the direction of driving engagement is being reversed.

The above and other objects and advantages of the invention will be more readily apparent when read in conjunction with the accompanying drawings in which:

FIGURE 1 is a sectional view in elevation of a roller clutch mechanism positioned between driving and driven members;

FIGURE 2 is a side view in elevation showing the construction of a portion of the clutch mechanism of FIGURE 1;

FIGURES 3 and 4 are views of the roller cage of FIGURE 1;

FIGURE 5 is an elevational side view of one of the end caps of FIGURE 1;

FIGURE 6 illustrates one form of drag spring used in the clutch mechanism;

FIGURE 7 is a sectional view in elevation of a clutch device illustrating a second embodiment of the invention;

FIGURE 8 is a view in elevation taken along the line 8—8 of FIGURE 7;

FIGURE 9 illustrates a form of drag spring used with the clutch mechanism of FIGURES 7 and 8.

The broader aspects of the present invention contemplate a clutch device which, when interposed between a driving and driven member, will be effective to drive the driven member in either direction and at the same time permit overrunning of the driven member in the direction it is being driven at the time. This invention also contemplates including means within the clutch mechanism itself for effecting disengagement of the clutch during the interval of reversal of direction of rotation.

Referring now to the drawings, FIGURE 1 illustrates a preferred embodiment of the invention in which 10 designates a clutch assembly in place between a pulley 12 and a shaft 14. For purposes of illustrating the invention, the pulley 12 will be considered a driving or input member and the shaft 14 a driven or output member. A belt or other suitable means connects the pulley 12 to a driving motor (not shown) which is operable in either direction. The driven shaft or output member 14 is adapted to be connected to other members such as pulleys or gears which may require driving in either direction. Such a connection may be made, for example, to the washer tub of a clothes washing machine, as it may be desirable to change the direction of tub rotation during a washing cycle.

The clutch assembly 10, illustrating a first embodiment of the invention, comprises an inner race member 16, an outer race member 18, a plurality of wedging or gripping elements in the form of rollers 20, a cage member 22 for supporting and spacing the rollers 20, and a drag spring 24.

The inner race member 16, here considered as part of the driven member, is secured to the driven shaft 14 by keying or other suitable means. The race member 16 includes a cylindrical surface 26 and a hub 27 adapted to rotatably support the cage member 22.

The outer race member 18, here considered as part of the driving member, is secured to the pulley 12 by a plurality of rivets 28. The race member 18 (FIGURE 2) includes an annular surface 30 in which are formed a plurality of pairs of cam surfaces 32 and 34, spaced circumferentially. The cam surfaces 32 and 34 are opposed ramps forming arch-like configurations which meet at peak points 36. The device illustrated has six such pairs of cam surfaces, but a greater or lesser number of pairs could be used.

A gripping element, roller 20, is associated with each pair of cam surfaces 32 and 34. The roller 20 is adapted to wedge between the cam surface 32 and the inner race surface 26 during clockwise rotation, and between cam surface 34 and inner race surface 26 during counterclockwise rotation as viewed in FIGURE 2.

The cage member 22 (FIGURES 3 and 4) is an annular member comprising an axially extending portion 38 which includes a plurality of openings or windows 40 for receiving the rollers 20. An annular flange 42, radially inwardly extending from one edge of portion 38, defines an opening 44 which is adapted to receive hub portion 27 of the inner race member 16, the diameter of opening 44 being a few thousandths of an inch larger than that of the hub portion 27. On the opposite edge of portion 38 is a radially outwardly extending annular flange 46, the outer diameter of which is only a few thousandths of an inch less than the diameter of the circle defining the cylindrical surface 30 on the outer race member 18. Thus, by virtue of the flanges 42 and 46, the cage member 22 is closely radially confined between the inner and outer race members. The purpose of arcuately extending slot 48 in the flange 46 will be more fully explained later.

Two substantially similar axially spaced annular end cap members 50 and 52 (FIGURE 1) confine the rollers and cage member. The end cap 50 comprises an axially extending annular flange 54, a radially outwardly extending flange 56 attached to flange 54, an axially extending flange 58, and a radially outwardly extending flange 60. Flange 58 connects flanges 56 and 60.

End cap 52 comprises flange members 62, 64, 66 and 68 corresponding respectively to flange members 54, 56, 58 and 60 of end cap 50. One difference between the end caps 50 and 52 is that in flange 64 of end cap 52 there is formed an arcuate slot 70 (FIGURE 5) extending through an arc of about 90 degrees, the purpose of which will be later explained.

Bearing members 72 and 74, here illustrated in their preferred form as ball bearings, journal the end cap members 50 and 52 on the shaft 14 from within flange members 54 and 62 respectively. It is noted that the outer race member 18, positioned between the flange portions 60 and 68 of end caps 50 and 52 respectively, axially spaces the end cap members. It is further noted that the resultant spacing between flanges 56 and 64 of the end cap members is effective to axially position cage member 22, flanges 42 and 46 of the latter being positioned closely adjacent the radially extending flanges 56 and 64 of the end cap members. The radial position of axially extending flanges 58 and 66 of the end cap members is such that it forms a close fit with the cylindrical surface 30 of the outer race member 18.

A bushing 76 is journalled on the outer surface of axially extending flange 62 of end cap member 52, permitting rotation of the end cap member 52 with respect to the bushing. The bushing 76 is fastened to a stationary portion of the device in which the clutch mechanism is incorporated, secure against rotating movement relative to that device. The bushing 76 may be made of a powdered bronze material, for example.

The drag spring 24, here shown in the form of a torsion spring, is fitted around the bushing 76. The torsion spring may be formed of one or more loops depending on the desired strength characteristics. At each end of the spring are prongs or tabs 78 and 80 (FIGURE 6) which, in the assembled clutch mechanism, are received through the slot 70 in the end cap 52 and extend into the slot 48 in the flange 46 of the cage member. The tabs 78 and 80 are long enough to engage the edges 48a and 48b of the slot 48. The free diameter of the drag spring 24 is smaller than the outer diameter of the bushing 76 and thus it needs to be unwound slightly to be placed on the bushing. Thus in the assembled relation a frictional fit exists between the bushing and the torsion spring member.

To confine the drag spring axially, a drag bushing flange 82 may be positioned around the bushing 76. Additionally, an annular closure member 84 is positioned around the bushing 76 and serves to confine both the bushing flange 82 and the drag spring 24. The closure member 84, the two end cap members 50 and 52, the outer race member 18 and the pulley 12 are secured together by a suitable means, preferably a plurality of circumferentially spaced rivets 28 (see FIGURE 1).

In operation, rotation of the pulley 12 and the attached outer race 18 in a clockwise direction (as viewed in FIGURE 2) is effective to wedge roller 20 between the inner race surface 26 and the cam surface 32. This drives the inner race member 16 and the attached shaft 14 in a clockwise direction. The bushing 76, as previously explained, is attached to a stationary part of the device in which the clutch is incorporated and does not rotate, since the drag spring 24 is in effect clamped to the bushing 76, it will not rotate unless released. With the rollers in engaging position, as the outer race member rotates clockwise it carries with it the cage member 22. As the cage member 22 rotates, the edge 48b of the slot 48 contacts tab 80 of the drag spring, thus expanding the drag spring, and the frictional hold of the drag spring on the bushing 76 is reduced. As long as the driving member, pulley 12 continues to rotate clockwise, the expanded drag spring rotates around the bushing 76. At this stage it is also possible for the driven shaft 14 with the attached inner race member 16 to overrun the driving member 12 in the clockwise direction.

When the direction of rotation of the driving member 12 is to be reversed to counterclockwise, the member 12 must necessarily slow down and come to a stop for a very short time interval before starting rotation in the reverse direction. As this stopped position is approached during the slow-down, the edge 48b exerts less and less pressure on the spring tab 80. Thus the drag spring 24 is allowed to contract and exert an increasing frictional clamping force on the bushing 76. In exerting this increased frictional drag force the spring 24 prevents the cage and rollers from moving during the instant when the direction of rotation of the driving member 12 is reversed. With the cage and rollers thus held stationary, the driving member 12 and the outer race member 18 to which the member 12 is attached shift to counterclockwise rotation (as viewed in FIGURE 2). Under these circumstances, the rollers 20 will be wedged between the cam surfaces 34 of the outer race and the inner race surface 26. In addition, the cage member 22 will now be carried counterclockwise and the edge 48a of the slot 48 of the cage member will push against the spring tab 78. This expands the drag spring 24 and its frictional hold on the bushing 76 is reduced. As long as the driving and driven members 12 and 14 are engaged and continue their counterclockwise rotation, the drag spring 24 will remain in its expanded condition and rotate on the grounded member, the stationary bushing 76. If the speed of the driven shaft 14 is increased by other means above the speed of the driving member it will be free to overrun the driving member in the direction it is being driven, in this instance counterclockwise.

This drag spring feature constitutes one of the very important features of this invention. It effectively provides a two-way clutch which is overrunning in both directions and provides simple means within the device itself for accomplishing reversal of rotation direction of a driven member as that becomes desirable.

FIGURES 7, 8 and 9 illustrate a second embodiment of our invention. This embodiment includes two cylindrical race surfaces, one of which is eccentric with respect to the other, and roller wedging means between the two eccentric race surfaces effective to lock the races together.

Reference character 110 designates a clutch assembly in place between a pulley 112 and a shaft 114. The pulley 112 will be considered to be a driving or input member and the shaft 114 a driven or output member. The pulley 112 is adapted to be connected to a driving motor (not shown) by a suitable driving belt. Again the driving motor may be driven in either direction, again the driven shaft or output member 114 may be connected to other members, such as pulleys or gears, to drive other elements.

The clutch assembly 110 comprises an inner race member 116, an outer race member 118, a roller wedging element 120, and a drag spring 124. The diameter of drag spring 124 is expanded by spreading prongs 144, 146 whereas spring 24 is expanded by pinching prongs 78, 80 toward each other.

The inner race member 116 may be secured to the shaft 114 by keying, splining or other suitable means, and has a cylindrical surface 126 which is concentric with the driven shaft 114.

The outer race member 118 defines an axially extending cylindrical race surface 130 which is disposed eccentrically with respect to the cylindrical surface 126 of the inner race member. The outer race member 118 is supported in a substantially cup-shaped housing 132, which is secured to the pulley 112 and thus forms part of the driving member.

A bushing 134 forms a bearing member for rotation on the inner race member 116 and has a recess 135 formed at the inner end which serves to support the pulley driving member 112.

At the left side of the device (as viewed in FIGURE 7) this shaft 114 is journalled in bushing 136; which is grounded against rotation. This grounding is accomplished through connection to tang portion 138 of member 140 which is secured to shaft bearing 142.

This drag spring 124 is a torsion spring which in its normal condition has a smaller diameter than the bushing flange 137 on which it is mounted. Thus in its mounted condition in the clutch assembly it exerts a clamping force on the bushing 136 in the same manner as the drag spring 24 of the first embodiment. In the mounted position the spring is restricted from axial motion by flanges 148 and 150. The drag spring 124 has two axially extending spring end tabs 144 and 146, which are effective to cage the single roller wedging element 120 disposed between the inner and outer race surfaces. The sum of the diameters of the cylinder defined by cylindrical surface 126 of the roller wedging element 120 is slightly less than the inside diameter of the cylinder defined by the outer race surface 130. Thus it is apparent that the roller 120 is only capable of moving between the two extreme positions shown by the full line and the dotted line in FIGURE 8.

An end cap member 152, attached to the pulley 112 and housing 132, forms part of the enclosure for the clutch mechanism.

In operation, rotation of pulley 112 in a clockwise direction (as viewed in FIGURE 8) will wedge the roller 120 between the inner and outer race surfaces 126 and 130 as shown by the solid line position of the roller. This movement will be sufficient to move the roller 120 against the spring end tab 146, unwinding the spring 124 and lessening frictional contact of the spring with the bushing 136 to the extent that the spring will freely rotate on the bushing. With the roller 120 in this position, the shaft 114 is free to overrun the driving member in the clockwise direction.

When the direction of rotation of the driving member 112 is reversed, there is an interval of time during which no motion is transmitted to the roller 120. During that time, the spring again coils up tightly with the spring end tabs close to the roller, and is effective to cage the roller and hold it out of wedging engagement with the race surfaces. Then, as the pulley and the eccentric outer race move in a counterclockwise direction (as seen in FIGURE 8), the roller assumes the relative position with respect to the race surfaces as shown by the dotted line. The roller now pushes on the spring end 144, tending to unwind the spring and reducing the drag torque produced between the spring and bushing flange 137 on which it is mounted, so that the spring rotates rather freely on the flange 137. Under these conditions the shaft 114 is free to overrun the driving member in the counter-clockwise direction.

Thus it is seen that this invention advantageously provides a clutch unit which can transmit rotation in two directions, as well as allow the driven member to overrun the driving member in the direction it is being driven at the time.

While certain embodiments of the invention have been specifically disclosed, it is to be understood that the invention is not limited thereto, as many variations will be apparent to those skilled in the art; and the invention is to be given the fullest possible interpretation within the terms of the following claims.

What is claimed is:

1. A two-way engaging device comprising: a rotatable driving member and a rotatable driven member, one of said members defining an inner race and the other of said members defining an outer race; gripper means disposed between said inner and outer races for selectively providing a wedgingly engaged drive between said driving and driven members to allow for joint rotation thereof in either a clockwise or counter-clockwise direction; a stationary member supporting one of said rotatable members; and holding means for selectively securing and releasing said gripper means with respect to said stationary member, said holding means including a yieldable brake member portion engageable with said stationary member and a connector portion engageable with said gripper means, said yieldable brake member portion yielding toward tighter engagement with said stationary member for momentarily securing said gripper means with respect thereto responsive to reversals of rotation of said rotatable members, and yielding away from engagement with said stationary member for releasing said gripper means therefrom responsive to rotation of said rotatable members.

2. The device according to claim 1 wherein said gripper means is rotatable, said braking means including a spring member mounted for rotation with said gripper means and adapted for increased frictional engagement with said stationary member while the direction of rotation of said engaging device is being reversed, and being biased for decreased frictional engagement with said stationary member when said driving and driven members are engaged with each other for rotation as a unit.

3. The device according to claim 2 wherein said stationary member includes a cylindrical surface concentrically disposed about the axis of rotation of said engaging device, and said spring member is of the torsion type having a portion thereof embracing said cylindrical surface.

4. The device according to claim 1 wherein one of said races includes a pair of cam surfaces, and wherein said gripper means includes a roller selectively engageable with respective said cam surface responsive to the direction of rotation of said driving member.

5. The device according to claim 1 wherein one of said races is disposed eccentrically with respect to the other, and wherein said gripper means includes a single roller wedging element disposed between said races.

6. The device according to claim 1 wherein said races are concentrically disposed with respect to each other, one of said races including a plurality of pairs of cam surfaces, and wherein said gripper means includes a plurality of roller elements, each of said roller elements associated with a respective pair of said cam surfaces; said device further including an annular cage member for receiving and positioning said roller elements, said cage member being operatively associated with said holding means for shifting the position of said roller elements with respect to said cam surfaces responsive to the direction of rotation of said driving member.

7. The device according to claim 3 wherein the opposite end portions of said torsion spring are provided with prongs operatively engaged with said gripper means, said gripper means impelling said prongs to unwrap said embracing portion of said spring for said cylindrical surface responsive to rotation of said driving member in either clockwise or counter-clockwise direction.

References Cited

UNITED STATES PATENTS

| | | | |
|---|---|---|---|
| 2,865,228 | 12/1958 | Weismann | 192—44 |
| 2,884,101 | 4/1959 | Warn | 192—44 |
| 3,055,471 | 9/1962 | Warn | 192—45 |
| 3,123,169 | 3/1964 | Young | 192—36 |

FOREIGN PATENTS 843,046   7/1952   Germany.

CARLTON R. CROYLE, *Primary Examiner.*

MARK NEWMAN, *Examiner.*

C. M. LEEDOM, *Assistant Examiner.*